United States Patent [19]
Tamura

[11] Patent Number: 5,148,073
[45] Date of Patent: Sep. 15, 1992

[54] WIRING DEVICE IN DIRECT CURRENT MACHINE

[75] Inventor: Masayuki Tamura, Ohta, Japan

[73] Assignee: Mitsuba Electric Manufacturing Co. Ltd., Gunma, Japan

[21] Appl. No.: 624,884

[22] Filed: Dec. 3, 1990

[30] Foreign Application Priority Data

Dec. 4, 1989 [JP] Japan .................. 1-140470[U]

[51] Int. Cl.⁵ .................................. H02K 13/00
[52] U.S. Cl. .................... 310/239; 310/42; 310/43; 310/71
[58] Field of Search ........... 310/71, 242, 89, 245, 310/91, 42, 43, 46, 177, 239, 249

[56] References Cited

U.S. PATENT DOCUMENTS

| | | | |
|---|---|---|---|
| 2,379,176 | 6/1945 | Mulheim | 310/71 U X |
| 4,355,253 | 10/1982 | Vollbrecht | 310/239 |
| 4,673,837 | 6/1987 | Gingerich | 310/239 |
| 4,673,838 | 6/1987 | Takagi | 310/239 |
| 4,851,730 | 7/1989 | Fushiya | 310/249 |
| 4,855,631 | 8/1989 | Sato | 310/239 |
| 4,870,309 | 9/1989 | Hosoya | 310/71 |
| 4,926,078 | 5/1990 | Isozumi | 310/71 |
| 4,931,681 | 6/1990 | Spaggiari | 310/89 |

FOREIGN PATENT DOCUMENTS 143868 9/1982 Japan.
141478 9/1984 Japan.

Primary Examiner—R. Skudy
Attorney, Agent, or Firm—McGlew & Tuttle

[57] ABSTRACT

A wiring device in a direct current machine, wherein brush are slidably held in brush boxes of a brush holder, a coupler embedded therein with lead terminals for feeding electric power to pigtails connected to the brushes is fixed to the brush holder, and a brush holder and the coupler are clamped by an end bracket and a yoke. Side walls connecting the brush boxes to each other are expandingly formed on an edge portion of the brush holder. A cutaway portion for positioning the coupler is provided in one of the side walls, and an engageable portion engageable with a forward end portion of the coupler is expandingly formed on the brush holder between the cutaway portion and the respective brush boxes.

18 Claims, 5 Drawing Sheets

WIRING DEVICE IN DIRECT CURRENT MACHINE

BACKGROUND OF THE INVENTION

1. Field of the Invention

This invention relates to a wiring device in a direct current (DC) machine, more particularly to a construction of connecting a brush holder to a coupler, and further relates to an effective one utilized in a DC motor for example.

2. Related Art Statement

In general, the coupler for power supply and the brush holder in the DC motor are formed separately of each other, and, to fix these members to each other, such a method is adopted that the coupler is press-fit into a yoke to be fixed therein, or the brush holder is fixed to the yoke by riveting, as described in Japanese Utility Model Unexamined Publication No. 57-143868.

In Japanese Utility Model Unexamined Publication No. 59-141478, there is disclosed such a technique that the coupler for power supply and the brush holder are formed integrally with each other by use of a same resin material.

However, with the method of individually fixing the coupler for power supply and the brush holder, which are formed separately of each other, to the yoke, it is necessary to individually position the brush holder and the coupler for power supply to the yoke, parts such as rivets and screws are needed for fixing the brush holder and the coupler individually, and clinching processes are respectively needed, thereby presenting the disadvantage that assembling work is inefficient.

Furthermore, with the wiring device in the DC machine, wherein the coupler for power supply and the brush holder are formed integrally with each other from a resinous material, the same kind of resin is used to form the coupler and the brush holder, whereby on the one hand the coupler projecting outwardly from the yoke becomes insufficient in the mechanical strength, and on the other hand the brush holder exposed to the frictional heat occurring between the brushes and a commutator becomes insufficient in the heat resistance.

SUMMARY OF THE INVENTION

It is an object of the present invention to provide a wiring device in a DC machine, wherein a brush holder and a coupler can be easily assembled, and both the mechanical strength and the heat resistance can be secured.

According to the present invention, the wiring device in the DC machine, wherein a plurality of brush boxes for slidably holding brushes are arranged circumferentially at intervals in a substantially disk-shaped brush holder; a coupler embedded therein with lead terminals for feeding electric power to pigtails connected to the brushes are fixed to the brush holder; and the brush holder and the coupler are clamped by an end bracket and a yoke; is characterized in that: side walls for connecting the brush boxes to each other are expandingly formed on an edge of the brush holder; a cutaway portion for positioning the coupler is opened in one of the side walls; engageable portions engageable with a forward end portion of the coupler are expandingly formed on the brush holder between the cutaway portion and the brush boxes; the lead terminals are projected from the forward end portion of the coupler; and the pigtails are connected to the lead terminals.

According to the above-described means, if the coupler is inserted into the cutaway portion of the brush holder and the forward end portion of the coupler is engaged with the engageable portion of the brush holder, then the coupler is fixed to the brush holder in a state where the coupler is positioned. Furthermore, when the brush at the forward end of the pigtail connected to the lead terminal projected from the forward end portion of the coupler is inserted into the brush box, whereby the brush is installed, so that the number of man-hours for assembling work can be reduced.

The coupler and the brush holder are formed separately from each other, whereby the coupler can be formed of a resinous material having a mechanical strength and the brush holder can be formed of a resinous material having a heat resistance, so that both the mechanical strength and the heat resistance can be secured.

DETAILED DESCRIPTION OF THE INVENTION

Figure 1:
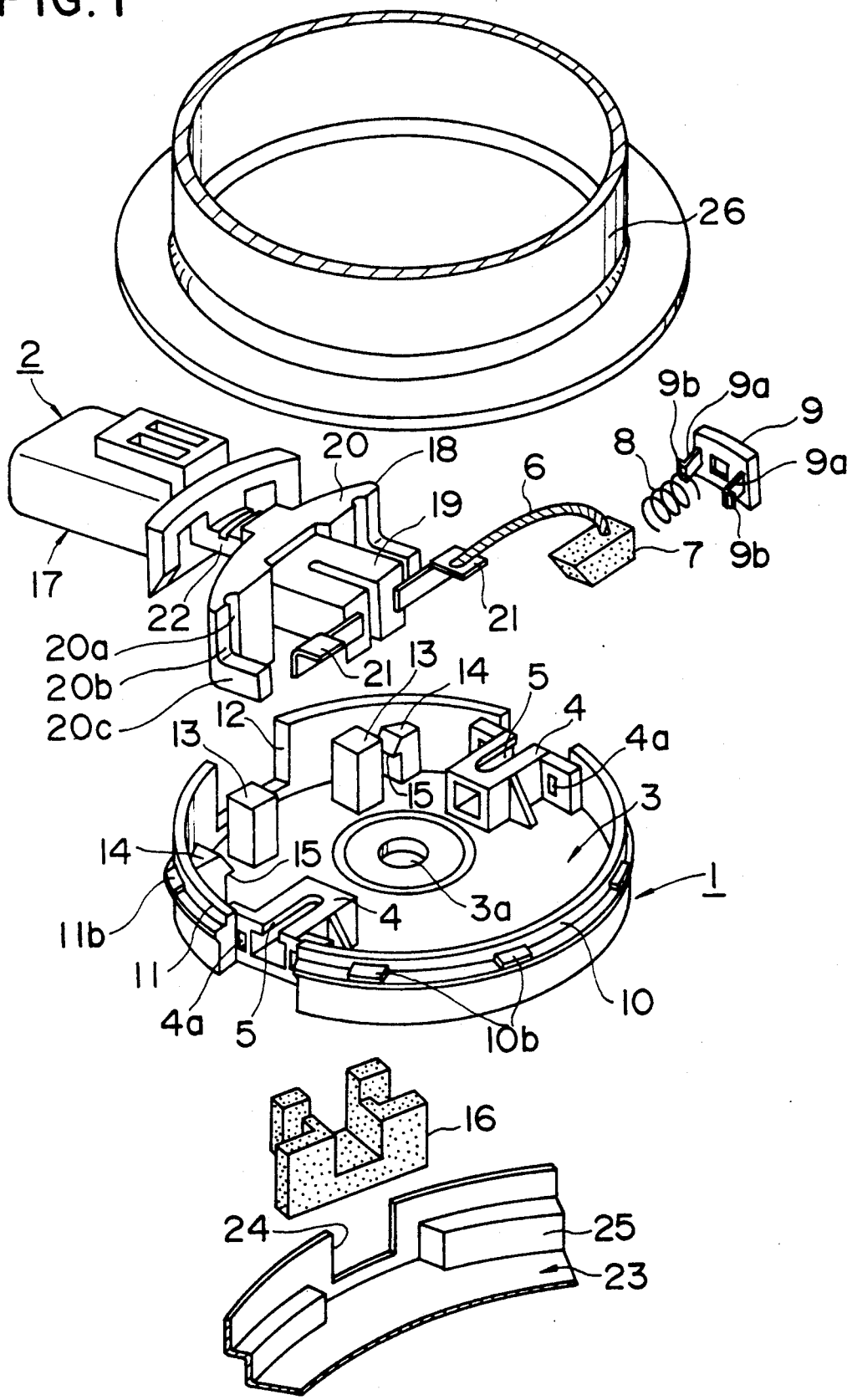
FIG. 1 is a disassembled perspective view showing the wiring device in the DC machine as being one embodiment of the present invention.
Figure 2:
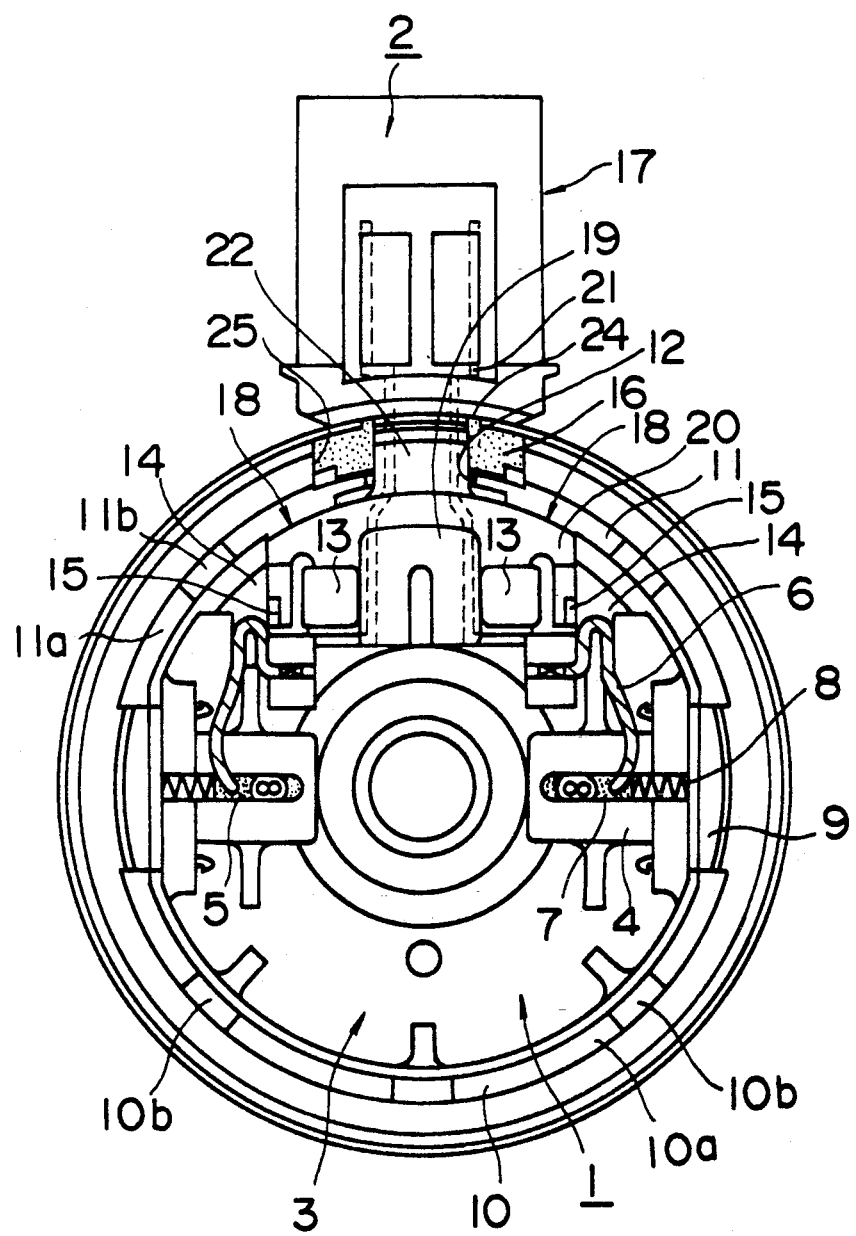
FIG. 2 is a plan view showing an assembled state thereof.
Figure 3:
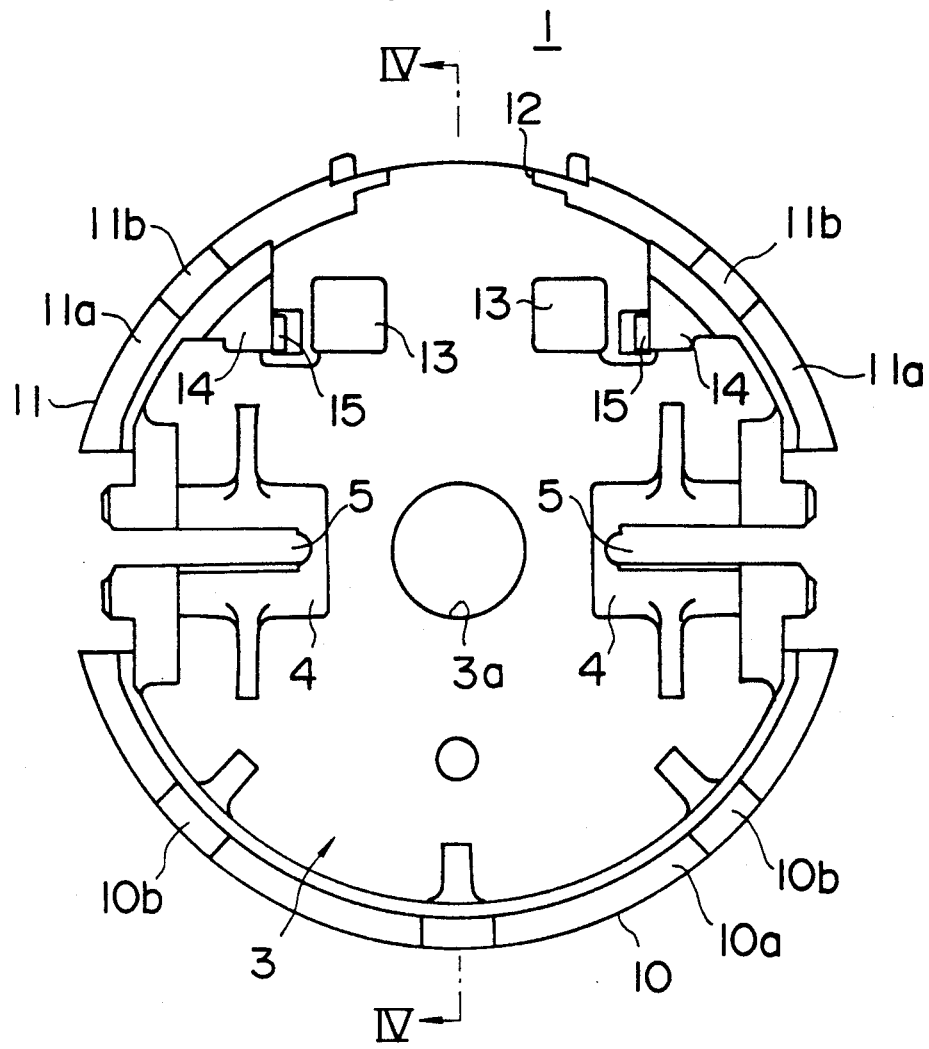
FIG. 3 is a plan view showing the brush holder.
Figure 4:
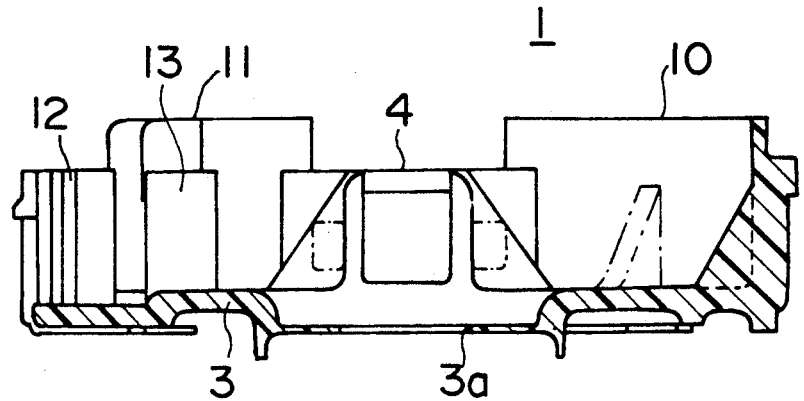
FIG. 4 is a sectional side view along the line IV—IV in FIG. 3.
Figure 5:
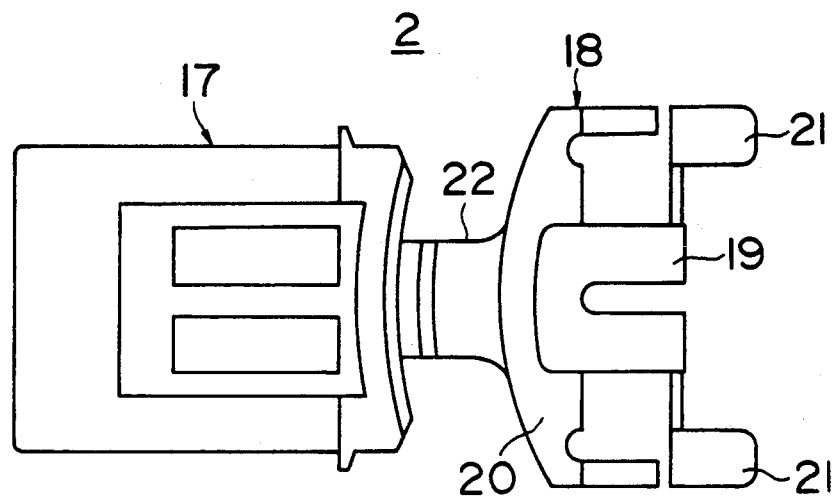
FIG. 5 is a plan view showing the coupler.
Figure 6:
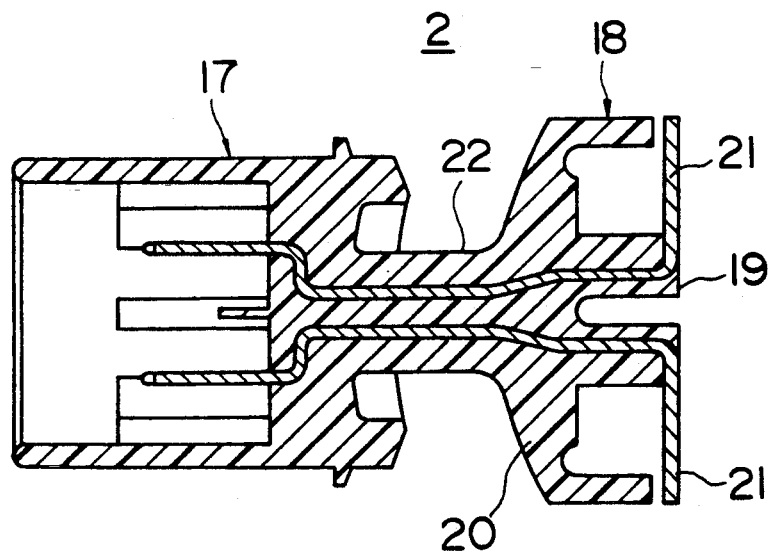
FIG. 6 is a sectional plan view showing the coupler.
Figure 7:
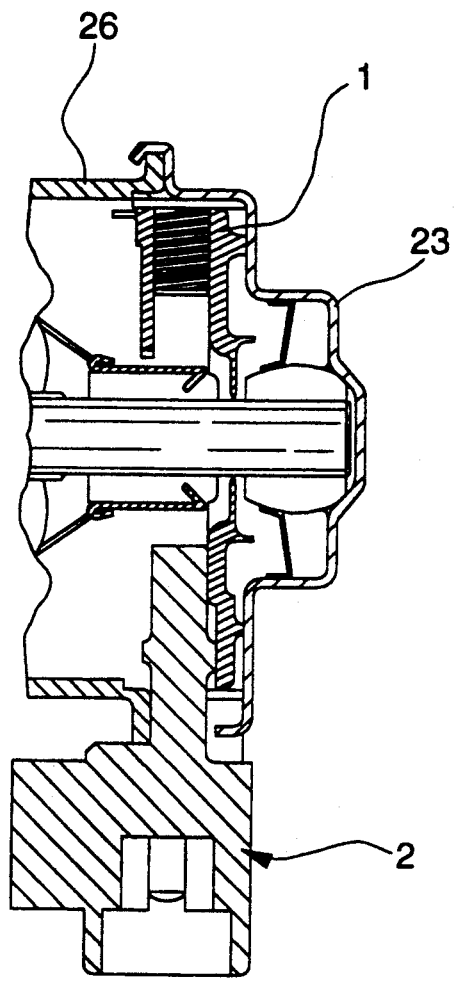
FIG. 7 is a cross sectional view showing a coupler clamped to a brush holder by an end bracket and yoke.

Referring now to the embodiment shown in FIGS. 1 to 6, the wiring device in the DC machine according to the present invention is of such an arrangement that a coupler 2 for power supply is fixedly connected onto a brush holder 1 of a dc motor. The brush holder 1 is integrally formed from a resinous material having the insulating property and the heat resistance, such for example as nylon having a high mechanical strength, PBT (polybutylene terephthalate) or PP (polypropylene), and is fixedly mounted at a position opposed to a commutator, not shown, in the motor. This brush holder 1 has a substantially disk-shaped base 3. On one of the end surfaces (hereinafter referred to the top surface) of this base 3, a pair of brush boxes 4 each formed to be a substantially regular square tubular shape are symmetrically arranged in a relationship opposed to each other with a phase difference of 180° therebetween, being integrally projected from the base 3 (hereinafter only one side will be described because of the symmetry). In the brush box 4, a pigtail insert hole 5 is opened elongatedly and disposed in the radial direction. A brush 7 embedded therein with a pigtail 6 is slidably inserted into the brush box 4, and the pigtail 6 is inserted into the pigtail insert hole 5. In the brush box 4, a brush spring 8 is disposed behind the brush 7, and a rear end portion of the brush box 4 is crowned with a cap 9 to close an opening. Accordingly, the brush 7 is urged by the brush spring 8 subject to a reaction force through the cap 9 inwardly in the radial direction.

Furthermore, the cap 9 is molded integrally with two thin engageable pieces 9a at the inner side surface thereof. An engageable pawl 9b is projected outwardly from a forward end of each of the engageable pieces 9a. When these engageable pieces 9a are inserted into engageable holes 4a of the brush box 4, the engageable pieces 9a are elastically flared outwardly, whereby the engageable pawls 9b are engaged with a rear wall portion of the brush box 4, so that the cap 9 can be detachably fixed to the brush box 4. To remove the cap 9 from the brush box 4, the engageable pawls 9b of the engageable pieces 9a are pressed inwardly, then the engageable pawls 9b are released from the engagement with the rear wall portion. Then, when the engageable pieces 9a are drawn out of the engageable holes 4a, the cap 9 can be readily removed from the brush box 4.

Side walls 10 and 11 connecting the brush boxes 4 to each other are expandingly formed on the edge of the base 3 in the brush holder 1. A coupler positioning cutaway portion 12 is disposed at a position about 90° apart from the brush boxes 4 in one of the side walls 11, being open in a substantially regular square shape through in the radial direction. The cutaway portion 12 is coupled thereto with a rubber grommet 16 which is formed to be a bushing having a substantially U-shape in cross section. On the bottom surface of the base 3, there are expandingly provided a pair of first engageable portions 13 each having a regular square shape in cross section and a pair of second engageable portions 14 each having a triangular shape in cross section, with these pairs being apart from each other. Projections 15 for supporting the coupler are expandingly formed on the tops of the second engageable portions 14, respectively. The above-described side walls 10 and 11 respectively have flange portions 10a and 11a each having a stepped shape projecting outwardly. A plurality of projecting portions 10b and 11b are formed at regular intervals on the top surfaces of these flange portions 10a and 11a. When the brush holder 1 is assembled to a yoke 26 to be described hereunder, these projecting portions 10b and 11b are brought into pressing contact with a surface to be assembled on the side of an opening end of the yoke 26, so that movement of the brush holder 1 about a fulcrum of a connecting portion 22 to be described hereunder of the coupler 2 can be prevented.

The coupler 2 is constructed such that a tubular portion provides a bases end portion 17 is connected to an engageable portion 18 through a shaft-shaped connecting portion 22 and these three portions are formed integrally with one another. This coupler 2 is formed of a resinous material having an insulating property and a mechanical strength, such for example as PET (polyethylene terephthalate), phenol and PPS (polyphenylene sulfite). The connecting portion 22 is formed to be a substantially regular square shape which can be coupled into the rubber grommet 16 coupled to the cutaway portion 12 of the brush holder 1. The engageable portion 18 is disposed at the side of the forward end of the coupler 2 and has a U-shaped portion 19 and an arcuate portion 20. The U-shaped portion 19 of this engageable portion 18 is installed onto the base 3 in a state where the U-shaped portion 19 is inserted into a space formed between the first engageable portions 13 and 13 and the respective ends of the arcuate portion 20 are inserted into spaces formed between the first engageable portions 13 and the second engageable portions 14, respectively.

More specifically, each of the ends of the arcuate portion 20 is formed with a longitudinal groove 20a, a cutaway portion 20b and a projected portion 20c formed by cutting away of the cutaway portion 20b. By forming the longitudinal groove 20a, the cutaway portion 20b and the projected portion 20c, the respective end portions of the arcuate portion are provided with elasticity, and, when the coupler 2 is installed onto the base 3, the projected portion 20c of the arcuate portion 20 can be deformed and coupled into a space formed between the first engageable portion 13 and the second engageable portion 14 to be locked with the projection 15 of the second engageable portion 14.

A pair of lead terminals 21 and 21 are projected from the forward end portion of the U-shaped portion 19 in the coupler 2, and each of the lead terminals 21 is fixed thereto with the pigtail 6 connected to the brush 7. The lead terminals 21 are embedded in the engageable portion 18 and the tubular portion 17, and the other ends of the lead terminals 21 are extended to an intermediate portion of the tubular portion 17. These ends of the lead terminals 21 are exposed in the tubular portion 17, and connected to a plug, not shown, which is coupled to the tubular portion 17, so that electric power from the plug can be fed to the brushes 7 through the pigtails 6.

Incidentally, a motor housing has the yoke 26 formed from a thin metal plate by press work into a cylindrical shape open at one end, and an end bracket 23 formed into a tray shape (both of these members are only partially shown). The end bracket 23 is crowned on the opening end of the yoke 26 with the brush holder 1 and the coupler 2 being clamped therebetween.

A portion of the end bracket 23 is formed with a cutaway portion 24 penetrating in the radial direction and formed to provide a substantially regular square shape capable of receiving the rubber grommet 16. Fixing portions 25 and 25 are expandingly formed at the both sides of the cutaway portion 24, respectively. Furthermore, an insert opening 3a for a rotary shaft of a motor is formed at the center of the base 3.

A method of assembling the wiring device in the above-described arrangement will hereunder be described.

First, the coupler 2 is assembled to the base 3 of the brush holder 1 to fix to each other. However, before this, the grommet 16 may be coupled into the connecting portion 22 of the coupler 2 or the grommet 16 may be coupled to the cutaway portion 24 of the end bracket 23.

When the coupler 2 and the brush holder 1 are assembled to each other, to engage the engageable portion 18 at the forward end of the coupler 2 with the first engageable portions 13 and the second engageable portions 14 of the brush holder 1, the U-shaped portion 19 of the coupler 2 is inserted into a space formed between the first engageable portions 13 and 13 and the arcuate portion 20 is inserted into spaces formed between the first engageable portions 13 and the second engageable portions 14, and the connecting portion 22 between the tubular portion 17 and the engageable portion 18 on the side of the coupler is coupled into the grommet 16, whereby the coupler 2 is fixed to the brush holder 1. At this time, the forward end portion of the arcuate portion 20 of the coupler 2 is engaged with the projections 15 of the second engageable portions 14, whereby upward movement of the coupler 2 can be prevented by this engagement. More specifically, each of the both end portions of the arcuate portion 20 has the longitudinal groove 20a, the cutaway portion 20b and the projected portion 20c, whereby the projected portion 20c can be readily coupled into a space formed between the engageable portions 13 and 14 while being elastically deformed, so that the projected portion 20c is engaged with the projection 15 so as not to be drawn out upwardly.

Thereafter, the brushes 7 and the brush springs 8 are successively inserted into the two brush boxes 4 and the caps 9 are installed on the rear end portions of the both brush boxes 4, so that the brushes 7 and the brush springs 8 can be prevented from falling off.

As described above, assembling of the coupler 2 and the brush holder 1 is completed, the both members are formed into a unitary structure, and thereafter, the coupler 2 and the brush holder 1, which are formed into the unitary structure, are mounted onto the end bracket 23. In this case, the cutaway portion 12 of the brush holder 1 is aligned with the cutaway portion 24 of the end bracket 23, and the brush holder 1 is installed into a recessed portion of the end bracket 23. At this time, the grommet 16 is coupled to the cutaway portion 12 of the brush holder 1 in a state where the grommet 16 is positioned by the fixing portions 25 and 25 at the both sides of the cutaway portion 24 in the end bracket 23.

Furthermore, the connecting portion 22 of the coupler 2 is coupled into grooves of the grommet 16.

Thereafter, the unitary structure of the coupler 2, the brush holder 1 and the end bracket 23, which are assembled by the above-described assembly work, is assembled to the opening end of the yoke 26.

At this time, the projected portions 10b, 11b formed on the flange portions 10a, 11a of the side walls 10, 11 of the brush holder 1 are brought into pressing contact with the contacting surface of the opening end of the yoke 26, so that the movement of the brush holder 1 about the fulcrum of the connecting portion 22 of the coupler 2 can be prevented.

Incidentally, the present invention should not necessarily be limited to the above embodiment, and various modifications can be adopted.

As has been described hereinabove, according to the present invention, the engageable portions are formed in the brush holder and the coupler for power supply, respectively, the brush holder and the coupler are integrally fixed to each other by the engagement between the engageable portions, and the pigtails are secured to the lead terminals projected from the forward end portion of the coupler, so that the rivets and the screws for fixing can be dispensed with, thereby realizing the reduction of the number of man-hours for assembling work and the decrease in costs.

Furthermore, the coupler for power supply and the brush holder are formed separately of each other, and thereafter, the both members are assembled to each other to form a unitary structure, whereby the coupler can be formed of the resinous material having the mechanical strength and the brush holder can be formed of the resinous material having the heat resistance, so that the mechanical strength for the coupler and the heat resistance for the brush holder can be secured as desired, and, as necessary, the inexpensive resinous material can be used to further decrease costs.

What is claimed is:

1. A wiring device of a direct current machine, comprising:
    a substantially disk-shaped brush holder;
    a plurality of brush boxes connected to said disk-shaped brush holder arranged circumferentially at intervals;
    a plurality of brushes equal in number to said plurality of brush boxes;
    side walls expandingly formed on an edge of said brush holder, said side walls connecting adjacent ones of said brush boxes to each other, one of said side walls including a cutaway portion;
    engageable portions expandingly formed between said cutaway portion and said brush boxes, said engageable portions being connected to said brush holder; and
    a coupler including a pair of lead terminals embedded therein, pigtails connected to said lead terminals and a forward end portion, said forward end portion engaging said engageable portions to connect said coupler to said brush holder, said lead terminals projecting from said forward end of said coupler, said lead terminals for feeding electric power to said pigtails, each of said pigtails being connected to one of said brushes, each of said brushes being received in said brush boxes, said brush holder and said coupler being clamped together by an end bracket and a yoke with said cutaway portion positioning said coupler relative to said brush holder.

2. A wiring device in a direct current machine as set forth in claim 1, wherein said coupler is coupled into said cutaway portion of said brush holder in a state where an axial direction of said coupler is normal to said brushes.

3. A wiring device in a direct current machine as set forth in claim 2, wherein:
    said pair of lead terminals are extended from a forward end of said coupler in directions opposite to each other and substantially in parallel to said brushes and
    said pigtails include pigtail-fixed portions at a forward end portion of each of said lead terminals extending in directions approaching said brushes.

4. A wiring device in a direct current machine as set forth in claim 1, wherein said engageable portions of said brush holder comprise two pairs of first and second engageable portions, each of said first and second engageable portions are expandingly formed integrally with said brush holder.

5. A wiring device in a direct current machine as set forth in claim 4, wherein one of said first and said second engageable portions are provided with means for preventing said coupler from being drawn out.

6. A wiring device in a direct current machine as set forth in claim 4, wherein:
    said second engageable portion is formed integrally with an inner wall surface of one of said side walls of said brush holder, and
    a surface of said second engageable portion, which is opposed to said first engageable portion, is formed integrally with a projection toward said first engageable portion for preventing said coupler from being drawn out.

7. A wiring device in a direct current machine as set forth in claim 1, wherein said coupler is provided at an intermediate portion thereof with a connecting portion, which is coupled into said cutaway portion of said brush holder so that said coupler can be assembled to said brush holder.

8. A wiring device in a direct current machine as set forth in calim 7, wherein:
said connecting portion of said coupler is coupled into a cutaway portion of said end bracket through a grommet,
said coupler and said brush holder are fixed to said end bracket in a state where said cutaway portion of said brush holder and said cutaway portion of said end bracket are aligned with each other, and further,
said coupler and said brush holder are clamped between said end bracket and said yoke in such a manner that said end bracket closes an opening end of said yoke.

9. A wiring device in a direct current machine as set forth in claim 1, wherein:
said coupler is of a unitary structure including therein a base end portion, an engageable portion at the forward end and connecting portion for connecting said base end portion to said engageable portion,
said connecting portion is coupled into said cutaway portion of said brush holder, and
said engageable portion is engaged with said engageable portion of said brush holder.

10. A wiring device in a direct current machine as set forth in claim 6, wherein:
said coupler is of a unitary structure including therein a base end portion, an engageable portion at the forward end and a connecting portion for connecting said base end portion to said engageable portion;
said engageable portion has a U-shaped portion and an arcuate portion,
said U-shaped portion extends toward the forward end of said engageable portion and is inserted into a space formed by said pair of first engageable portions,
said arcuate portion has end portions formed at opposite sides of said U-shaped portion and inserted into spaces formed between respective pair of first engageable portions and second engageable portions of said brush holder; and
said lead terminals are extended out of respective forward end portions of said U-shaped portion.

11. A wiring device in a direct current machine as set forth in claim 10, wherein each of the end portions of said arcuate portion includes: a longitudinal groove; a cutaway portion formed at the outside of said longitudinal groove; and a projected portion projectedly shaped toward said first and said second engageable portions by forming of said cutaway portion and elastically inserted into a space formed between said first and said second engageable portions.

12. A wiring device in a direct current machine as set forth in claim 1, wherein each of said brush boxes includes: a hollow box body extending in a radial direction of said brush holder and inserted thereinto with one of said brushes from outer end thereof; and a pigtail insert hole formed from the outer end toward the inner end in a top wall surface of said hollow box body.

13. A wiring device in a direct current machine as set forth in claim 12, wherein each of said brush boxes is provided with: a spring biasing each of said brushes housed in said brush boxes in a direction from the outer end to an inner end; and a cap detachably provided at the outer end of each said brush boxes so as to hold said brushes in said brush boxes through said spring.

14. A wiring device in a direct current machine as set forth in claim 1, wherein said end bracket has a cutaway portion for mounting a grommet and fixing portions for positioning said grommet.

15. A wiring device in a direct current machine as set forth in claim 1, wherein:
stepped flange portions projecting outwardly are provided on outer peripheral sides of said side walls of said brush holder, and
a plurality of projected portions are formed on top surfaces of said flange portions at predetermined intervals.

16. A wiring device in a direct current machine as set forth in claim 1 wherein:
said brush holder is formed of a resinous material having both an insulating property and a heat resistance, and
said coupler is formed of a resinous material having both an insulating property and a mechanical strength.

17. A wiring device of a direct current machine, comprising:
a substantially disk-shaped brush holder formed of resin;
a plurality of brush boxes connected to said disk-shaped brush holder arranged circumferentially at intervals;
a plurality of brushes equal in number to said plurality of brush boxes;
side walls formed of resin, said side walls being resiliently formed on an edge of said brush holder, said side walls connecting adjacent ones of said brush boxes to each other, one of said side walls including a cutaway portion;
resilient engageable portions formed of resin between said cutaway portion and said brush boxes, said engageable portions being connected to said brush holder; and
a coupler including a pair of lead terminals embedded therein, pigtails connected to said lead terminals and a forward end portion, said forward end portion engaging said engageable portions to connect said coupler to said brush holder, said lead terminals projecting from said forward end of said coupler, said lead terminals for feeding electric power to said pigtails, each of said pigtails being connected to one of said brushes, each of said brushes being fixed to an associated brush holder, said brush holder and said coupler being clamped together by an end bracket and a yoke with said cutaway portion positioning said coupler relative to said brush holder, said coupler and said brush holder being assembled to form a unitary structure without using screws.

18. A wiring device of a direct current machine, comprising:
a substantially disk-shaped brush holder;
a plurality of brush boxes connected to said disk-shaped brush holder arranged circumferentially at intervals;
a plurality of brushes equal in number to said plurality of brush boxes;
side walls expandingly formed on an edge of said brush holder, said side walls connecting adjacent ones of said brush boxes to each other, one of said side walls including a cutaway portion;
engageable portions expandingly formed between said cutaway portion and said brush boxes, said engageable portions being resilient and being connected to said brush holder; and a coupler including a pair of lead terminals embedded therein, pigtails connected to said lead terminals, said lead terminals for feeding electric power to said pigtails, each of said pigtails being connected to one of said brushes, each of said brushes being fixed to an associated brush holder, said brush holder and said coupler being clamped together by an end bracket and a yoke with said cutaway portion positioning said coupler relative to said brush holder; and snap connection means including said brush holder engageable portions and a forward end portion of said coupler for snap in engagement of said coupler with said brush holder.

* * * * *